United States Patent
Samuel et al.

(10) Patent No.: US 9,938,815 B2
(45) Date of Patent: Apr. 10, 2018

(54) ESTIMATING AND PREDICTING WELLBORE TORTUOSITY

(71) Applicant: Landmark Graphics Corporation, Houston, TX (US)

(72) Inventors: Robello Samuel, Houston, TX (US); Gustavo A. Urdaneta, Houston, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 654 days.

(21) Appl. No.: 14/368,313

(22) PCT Filed: Aug. 30, 2013

(86) PCT No.: PCT/US2013/057580
§ 371 (c)(1),
(2) Date: Jun. 24, 2014

(87) PCT Pub. No.: WO2015/030799
PCT Pub. Date: Mar. 5, 2015

(65) Prior Publication Data
US 2015/0226052 A1 Aug. 13, 2015

(51) Int. Cl.
*E21B 47/022* (2012.01)
*E21B 44/02* (2006.01)
*E21B 45/00* (2006.01)
*G05B 17/02* (2006.01)

(52) U.S. Cl.
CPC ............. *E21B 44/02* (2013.01); *E21B 45/00* (2013.01); *E21B 47/022* (2013.01); *G05B 17/02* (2013.01)

(58) Field of Classification Search
None
See application file for complete search history.

(56) References Cited

U.S. PATENT DOCUMENTS 6,269,892 B1 * 8/2001 Boulton ................. E21B 7/067
175/61
6,438,495 B1 8/2002 Chau et al.
(Continued)

FOREIGN PATENT DOCUMENTS

WO WO-2005090750 A1 9/2005
WO WO-2014133501 A1 9/2014

OTHER PUBLICATIONS

International Search Report, Application No. PCT/US2013/057580, dated May 15, 2014.
(Continued)

*Primary Examiner* — Tuan Doa (57) ABSTRACT

Estimating and predicting wellbore tortuosity. At least some of the illustrative embodiments are methods including: receiving, by a computer system, an indication of rotational drilling time and slide drilling time for a wellpath; calculating a value indicative of tortuosity for the wellpath based on the indication of rotational drilling time and slide drilling time for the wellpath; determining, by the computer system, that the wellpath exceeds a tortuosity threshold, the determining based on the value indicative of tortuosity; and changing a drilling parameter regarding the wellpath responsive to determining that the wellpath exceeds the tortuosity threshold.

23 Claims, 11 Drawing Sheets (56) References Cited

U.S. PATENT DOCUMENTS

| | | | |
|---|---|---|---|
| 8,210,283 B1* | 7/2012 | Benson | E21B 7/04 |
| | | | 175/26 |
| 2004/0149431 A1* | 8/2004 | Wylie | C09K 8/12 |
| | | | 166/242.1 |
| 2005/0132794 A1* | 6/2005 | Spross | E21B 7/067 |
| | | | 73/152.03 |
| 2009/0319241 A1 | 12/2009 | Samuel | |
| 2010/0307742 A1 | 12/2010 | Phillips et al. | |
| 2012/0179445 A1 | 7/2012 | Mitchell | |
| 2012/0330551 A1 | 12/2012 | Mitchell et al. | |
| 2013/0140088 A1* | 6/2013 | Williams | E21B 7/04 |
| | | | 175/45 |
| 2013/0161096 A1* | 6/2013 | Benson | E21B 7/04 |
| | | | 175/26 |
| 2014/0379133 A1* | 12/2014 | Toma | E21B 44/00 |
| | | | 700/275 |

OTHER PUBLICATIONS

Intellectual Property Office of Singapore, Examination Report, dated Sep. 5, 2016, 4 pages, Singapore.

* cited by examiner

| MD (ft.) | INC (deg) | AZM (deg) | TVD (ft.) | VERTICAL SECTION (ft.) | DLS (°/100) | BUILD (°/100) | TURN (°/100) | MD FROM (ft.) | MD TO (ft.) | DRILLING MODE | TFO (deg) | GP DELL (%) |
|---|---|---|---|---|---|---|---|---|---|---|---|---|
| 5014.74 | 18.20 | 69.27 | 4359.18 | 2178.84 | 2.13 | -1.93 | -2.82 | 5014.7 | 5031 | ROTATE | | |
| 5031.74 | 17.89 | 69.15 | 4375.35 | 2183.80 | 1.84 | -1.82 | -0.71 | 5031 | 5044 | ROTATE | | |
| | | | | | | | | 5044 | 5048 | ROTATE | | |
| | | | | | | | | 5048 | 5049 | ROTATE | | |
| 5078.77 | 17.37 | 68.80 | 4420.17 | 2197.22 | 1.13 | -1.11 | -0.74 | 5049 | 5059 | ROTATE | | |
| | | | | | | | | 5059 | 5062.7 | ROTATE | | |
| | | | | | | | | 5062.7 | 5078 | SLIDE | -140°G | |
| | | | | | | | | 5078 | 5090 | SLIDE | -70°G | |
| | | | | | | | | 5090 | 5122 | SLIDE | -100°G | |
| 5172.37 | 20.39 | 68.00 | 4508.72 | 2225.87 | 3.24 | 3.23 | -0.85 | 5122 | 5137 | ROTATE | | |
| | | | | | | | | 5137 | 5142 | SLIDE | -60°G | |
| | | | | | | | | 5142 | 5144 | ROTATE | | |
| | | | | | | | | 5144 | 5154 | SLIDE | -60°G | |
| | | | | | | | | 5154 | 5177 | ROTATE | | |
| | | | | | | | | 5177 | 5181 | SLIDE | -170°G | |
| | | | | | | | | 5181 | 5183 | ROTATE | | |
| | | | | | | | | 5183 | 5200 | ROTATE | | |
| | | | | | | | | 5200 | 5211 | SLIDE | -100°G | |
| | | | | | | | | 5211 | 5216 | SLIDE | 170°G | |
| 5268.54 | 16.78 | 67.11 | 4599.86 | 2254.99 | 3.77 | -3.75 | -0.93 | 5216 | 5236 | SLIDE | 170°G | |
| | | | | | | | | 5236 | 5270 | ROTATE | | |
| | | | | | | | | 5270 | 5287 | SLIDE | 130°G | |
| | | | | | | | | 5287 | 5307 | SLIDE | 130°G | |

ESTIMATING AND PREDICTING WELLBORE TORTUOSITY

CROSS-REFERENCE TO RELATED APPLICATIONS

None.

BACKGROUND

A number of issues may arise when drilling a well into a hydrocarbon bearing formation. The issues that arise may be a result of the formation itself, or the quality of the wellpath. In some cases, there may be a correlation between the undulations present in the wellpath and drilling issues.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not in function. In the following discussion, and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Wellbore" shall mean a hole drilled into the Earth's crust used directly or indirectly for the exploration or extraction of natural resources, such as oil, natural gas, or water.

"Wellpath" shall mean a planned or actual path of a wellbore or portion of a wellbore.

"Rotational drilling" shall mean planned or actual drilling where at least some of the rotation of the drill bit is supplied by rotation of the drillstring from the surface.

"Slide drilling" shall mean planned or actual drilling where the drill bit is rotated down hole while the drillstring at the surface is held against rotation.

"Surface" shall mean any point residing 10 feet below ground level and extending upward in relation to the local force of gravity.

"Offset well" shall mean a well drilled in the past or being drilled concurrently with a planned or actual wellbore of interest.

"Dogleg severity" shall mean a value related to the overall curvature of a wellpath between survey points.

"Tortuosity threshold" shall mean a value indicative of an expected or actual tortuosity above which adjustments may be made to the drilling plan.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods and systems of calculating a tortuosity value for a wellpath based on a relationship between rotational drilling time and slide drilling time. In an example embodiment, data from a slide sheet prepared for a planned wellpath is input into a model which calculates a tortuosity value for a planned wellpath based on, at least in part, the relationship between planned rotational drilling and slide drilling time. If the tortuosity value calculated by the model is above a predetermined tortuosity threshold, adjustments may be made to the drilling plan or to other drilling parameters. The specification first turns to a high level overview.

Figure 1:
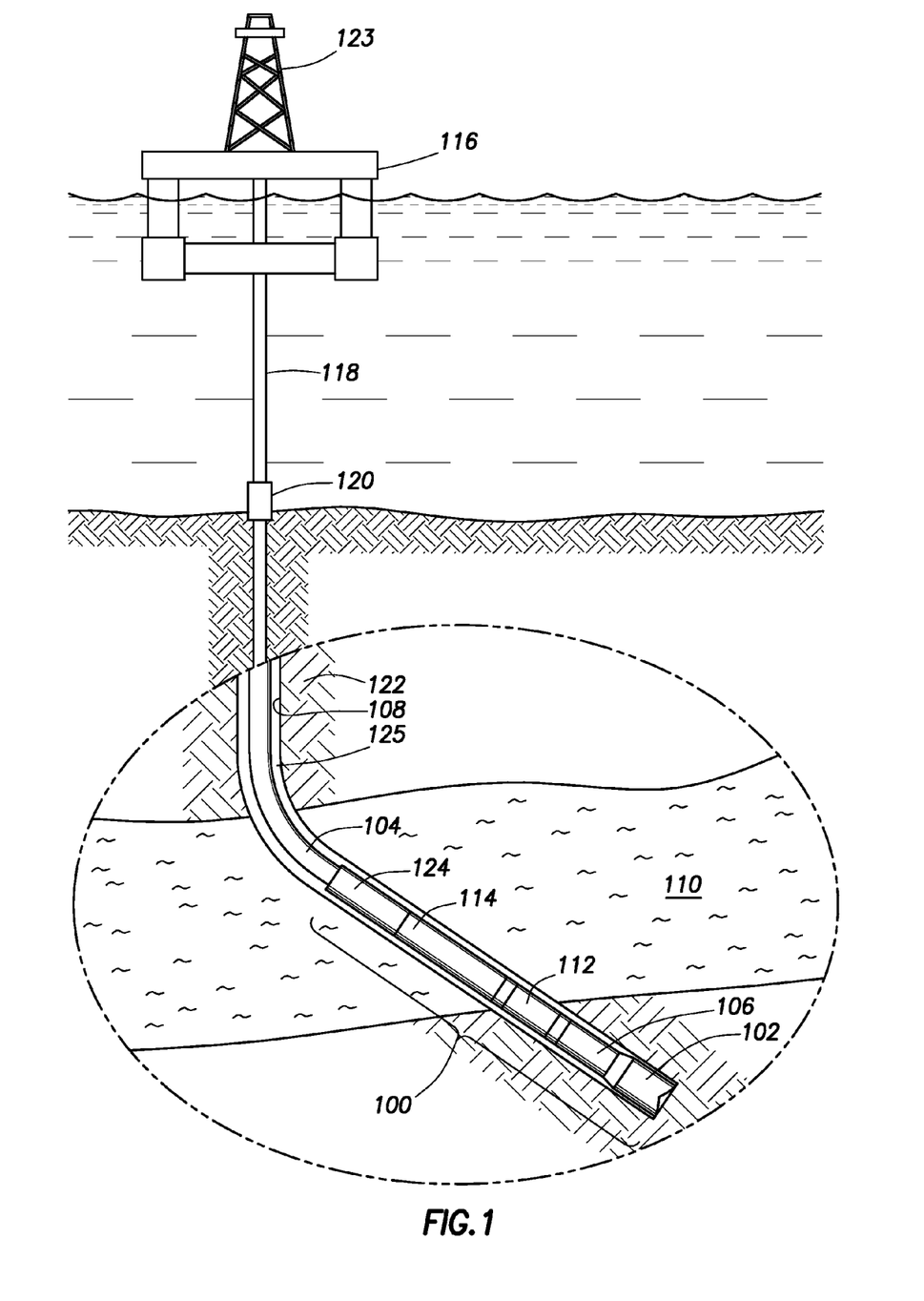
FIG. 1 is a partial, cross-sectional elevation view that shows an offshore drilling system in accordance with at least some embodiments.

FIG. 1 shows an example subsea drilling operation. In particular, FIG. 1 shows a bottomhole assembly 100 for a subsea drilling operation, where the bottomhole assembly 100 illustratively comprises a drill bit 102 on the distal end of the drillstring 104. Various logging-while-drilling (LWD) and measuring-while-drilling (MWD) tools may also be coupled within the bottomhole assembly 100. In the example system, a logging tool 106 may be coupled just above the drill bit, where the logging tool may read data associated with the wellbore (e.g., inclination, and direction). In some cases, the bottomhole assembly 100 may comprise a mud motor 112. The mud motor 112 may derive energy from drilling fluid flowing within the drillstring 104 and, from the energy extracted, the mud motor 112 may rotate the drill bit 102 (and if present, the logging tool 106) separate and apart from rotation imparted to the drillstring by surface equipment. The mud motor may also comprise a bent housing sub assembly (not specifically shown in FIG. 1, but which will be discussed later) to aid in altering the trajectory of the wellbore. Additional logging tools may reside above the mud motor 112 in the drillstring, such as illustrative logging tool 114.

The bottomhole assembly 100 is lowered from a drilling platform 116 by way of the drillstring 104. The drillstring 104 extends through a riser 118 and a well head 120. Drilling equipment supported within and around derrick 123 (illustrative drilling equipment discussed in greater detail with respected to FIG. 2) may rotate the drillstring 104, and the rotational motion of the drillstring 104 and/or the rotational motion created by the mud motor 112 causes the bit 102 to form the wellbore 108 through the formation material 122. The volume defined between the drillstring 104 and the wellbore 108 is referred to as the annulus 125. The wellbore 108 penetrates subterranean zones or reservoirs, such as reservoir 110, believed to contain hydrocarbons in a commercially viable quantity.

In accordance with at least some embodiments, the bottomhole assembly 100 may further comprise a communication subsystem. In particular, illustrative bottomhole assembly 100 comprises a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drillstring 104, acoustic telemetry through the pipes of the drillstring 104, electromagnetic telemetry, optical fibers embedded in the drillstring 104, or combinations), and likewise the telemetry module 124 may receive information from the surface over one or more of the communication channels.

Figure 2:
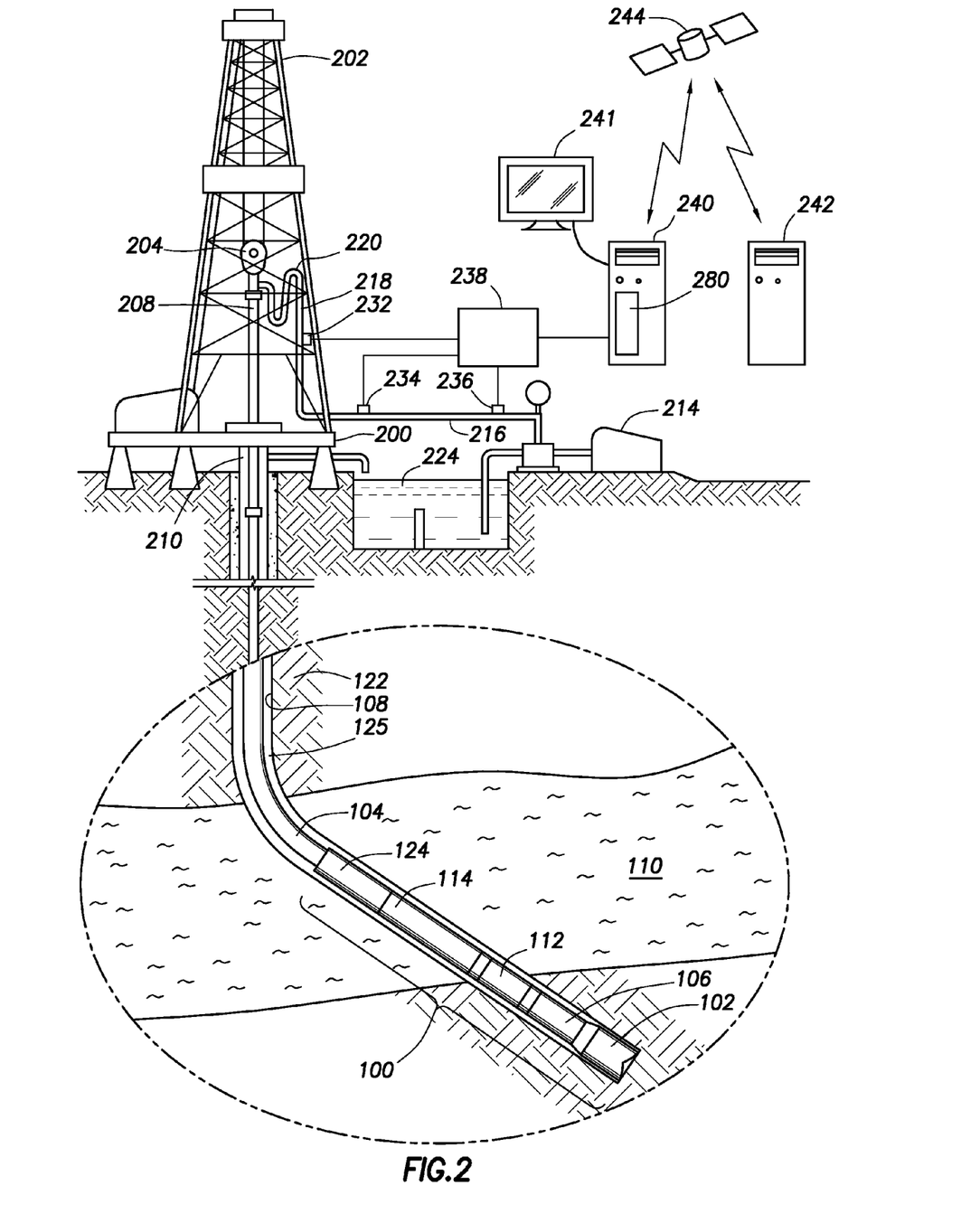
FIG. 2 is a partial, cross-sectional elevation view that shows a land-based drilling system in accordance with at least some embodiments.

FIG. 2 shows an example land-based drilling operation. In particular, FIG. 2 shows a drilling platform 200 equipped with a derrick 202 that supports a hoist 204. The hoist 204 suspends a top drive 208, the hoist 204 and top drive rotate and lower the drillstring 103 through the wellhead 210. Drilling fluid is pumped by mud pump 214 through flow line 216, stand pipe 218, goose neck 220, top drive 208, and down through the drillstring 104 at high pressures and volumes to emerge through nozzles or jets in the drill bit 102. The drilling fluid then travels back up the wellbore via the annulus 125, through a blowout preventer (not specifically shown), and into a mud pit 224 on the surface. On the surface, the drilling fluid is cleaned and then circulated again by mud pump 214. The drilling fluid is used to cool the drill bit 102, to carry cuttings from the base of the wellbore to the surface, and to balance the hydrostatic pressure in the rock formations.

In the illustrative case of the telemetry module 124 encoding pressure pulses that propagate to the surface, one or more transducers, such as transducers 232, 234, and/or 236, convert the pressure signal into electrical signals for a signal digitizer 238 (e.g., an analog-to-digital converter). While three transducers 232, 234, and/or 236 are illustrated, more transducers or fewer transducers may be used in particular situations. The digitizer 238 supplies a digital form of the pressure signals to a surface computer 240 or some other form of a data processing device. Surface computer 240 operates in accordance with software (which may be stored on a computer-readable storage medium) to monitor and control the drilling processing, including instructions to process and decode the received signals related to telemetry from downhole. The surface computer 240 is communicatively coupled to many devices in and around the drilling site, and such communicated couplings are not shown as to not to unduly complicate the discussion.

In some cases, data gathered and/or generated in and around the drill site (e.g., estimated or actual tortuosity data), as well as the logging data sent by the telemetry module 124, may be displayed on a display device 241. In yet still other example embodiments, the surface computer 240 may forward the data to another computer system, such as a computer system 242 at the operations center of the oilfield services provider, the operations center remote from the drill site. The communication of data between computer system 240 and computer system 242 may take any suitable form, such as over the Internet, by way of a local or wide area network, or as illustrated over a satellite 244 link.

Overview of Slide Drilling and Rotational Drilling

The trajectory of a wellpath may include straight vertical sections, curved sections, and straight non-vertical sections in order to reach a specified target. The driller will alternate between periods of slide drilling and rotational drilling in order to reach the specified target along the wellpath. Slide drilling is used to build, correct, or change the angle of drilling in the wellbore. On the other hand, rotational drilling is used to maintain the trajectory of the wellbore at the current azimuth and inclination. In other words, when the desired direction of the wellbore is attained, rotational drilling is used to continue drilling straight ahead, whereas slide drilling is used to create a curved path. The slide drilling mode and rotation drilling mode are described in more detail with respect to FIGS. 3A and 3B.

Figure 3A:
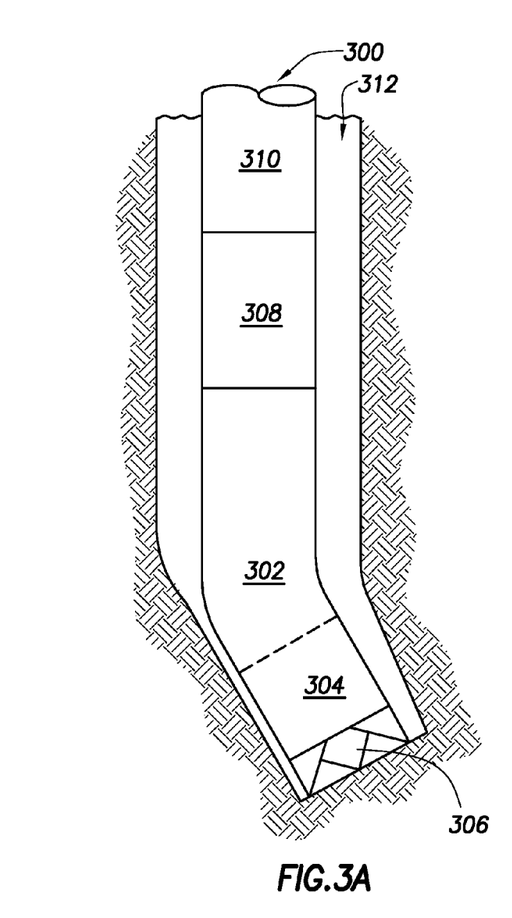
FIG. 3A is an elevation cutaway view of a bent housing mud motor in a wellbore in accordance with at least some embodiments.
Figure 3B:
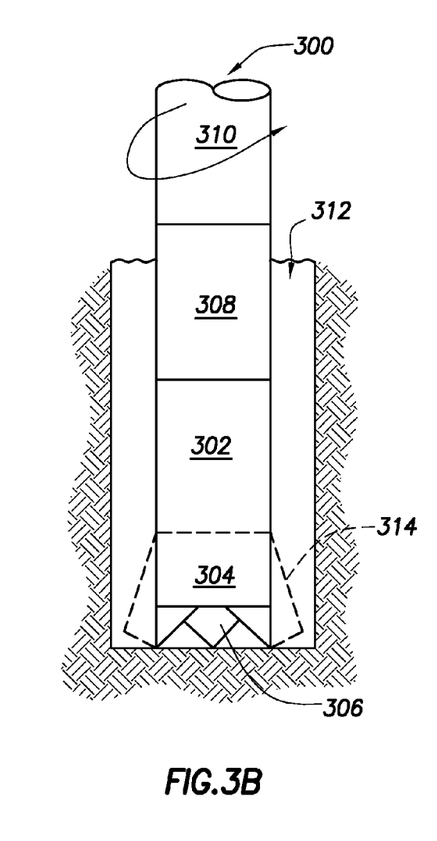
FIG. 3B is a elevation cutaway view of a bent housing mud motor in a wellbore in accordance with at least some embodiments.

FIGS. 3A and 3B show a steerable mud motor housing 300 comprising a bent sub assembly 302, a motor 304, and a drill bit 306. It should be noted that the angle of the bend shown in the bent sub assembly 302 has been exaggerated for clarity, and that in practice the bend may be on the order of one or two degrees from the axis of the mud motor housing.

As discussed above, the bent sub assembly is used in one of two modes: a rotational drilling mode and a slide drilling mode. FIG. 3A shows the wellbore 312 and mud motor housing 300 during a period of slide drilling. The slide drilling mode is used to create a curved path. During slide drilling, drilling fluid flowing through the drillstring causes the motor 304 to rotate the drill bit 306 while the drillstring at the surface is held against rotation. Because the drillstring is not rotating from the surface during slide drilling, the angle and direction of the bent sub assembly 302 determines the direction and curvature of drilling. The angle and direction of the bent sub assembly 302 can be determined from the surface by obtaining information about the orientation of the bent sub assembly 302 through measuring instruments downhole (such as MWD or LWD tools located within the BHA 308). By changing the orientation of the drillstring, and thus changing the direction the bent sub assembly may be directed, the driller can thus change the direction of the drilling.

FIG. 3B shows the wellbore 312 and mud motor housing 300 during rotational drilling. During rotational drilling, the wellbore is drilled to maintain the current trajectory (e.g., the current azimuth and inclination), as opposed to creating a curved path. In particular, the entire drillstring is rotated from the surface, including motor 304, and drill bit 306. During rotational drilling, because the distal end of the drillstring is bent at an angle from the axis of the remainder of the drillstring, the distal end of the drillstring may "sweep" around the borehole within the area indicated by dashed lines 314.

Using a combination of slide drilling and rotational drilling, the driller attempts to drill the wellbore along the planned wellpath trajectory. Despite attempting to follow the planned wellpath trajectory, it is possible that the actual drilled path may be off course or may have some unexpected tortuosity as drilling gets underway. Although some tortuosity may be expected, excessive tortuosity may cause drilling issues.

Planning a Wellpath

Figure 4:
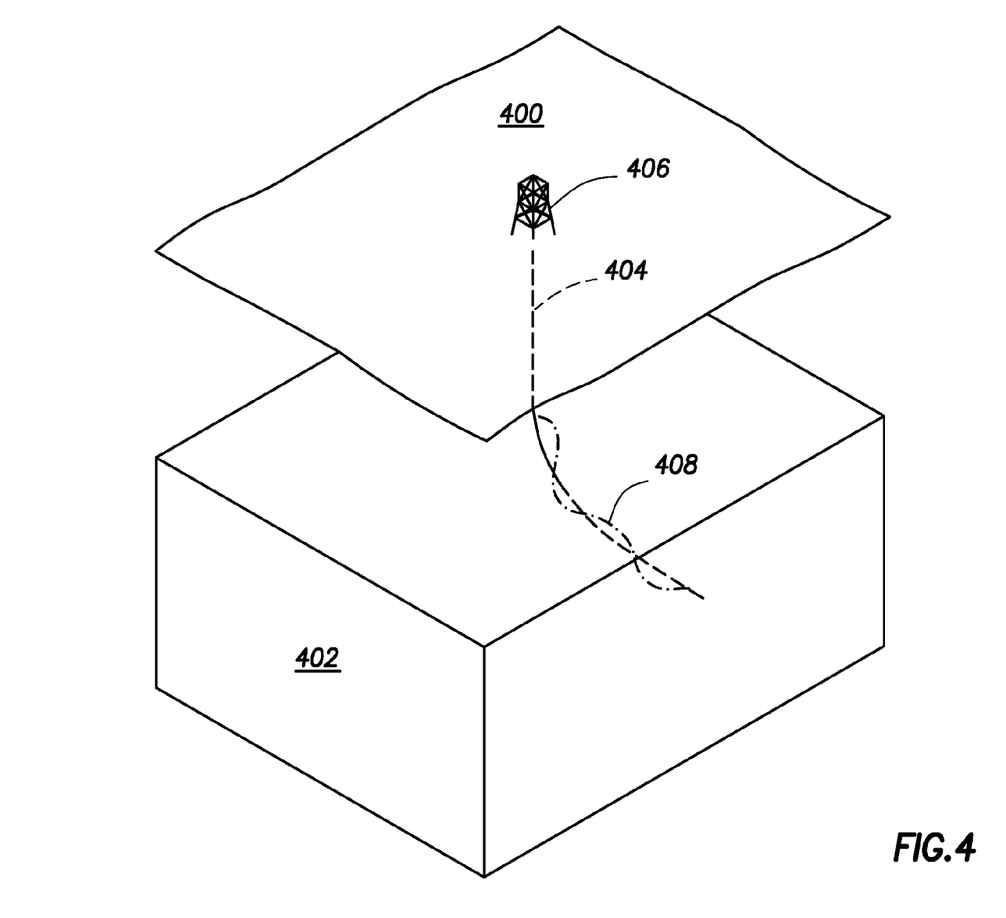
FIG. 4 is a perspective cutaway view which shows a portion of a hydrocarbon bearing formation in accordance with at least some embodiments.

FIG. 4 shows a perspective cutaway view of a portion of the earth's crust. In particular, FIG. 4 shows the surface 400 of the earth, and below the surface 400 is a portion of a hydrocarbon bearing formation 402. The overburden layer between the surface 400 and the hydrocarbon bearing formation 402 is not shown so as to not unduly complicate the figure. FIG. 4 also shows a planned wellpath 404 extending to and through the hydrocarbon bearing formation, and the planned wellpath having an estimated tortuosity 408 (shown by dashed-dot-dashed line and exaggerated for clarity). Planned wellpath 404 is associated with derrick 406.

As the wellbore associated with planned wellpath 404 is drilled into the hydrocarbon bearing formation, the characteristics of the wellbore may cause any number of drilling events. For example, wells drilled into an earth formation may experience a stuck-pipe situation, a collapse of the wellbore, or a tight hole. In one embodiment, the possibility of issues arising out of a wellbore drilled along planned wellpath 404 depends, in part, on the tortuosity of wellpath 404, where the tortuosity of a wellpath may be thought of as the "smoothness" of the wellpath. A "smoother" wellpath may be indicative of a more efficient drilling operation, and may be associated with the lower probability of the occurrence of a drilling event. On the other hand, a less smooth wellpath may be indicative of a less efficient drilling operation. A wellpath having high tortuosity may be quantified by having a higher dogleg severity, higher curvature, and/or more spiraling. A wellpath having high tortuosity may thus be indicative of a wellpath having increased risk of drilling issues. A more detailed view of a planned wellpath and some estimated tortuosity is shown in relation to FIG. 5.

Figure 5:
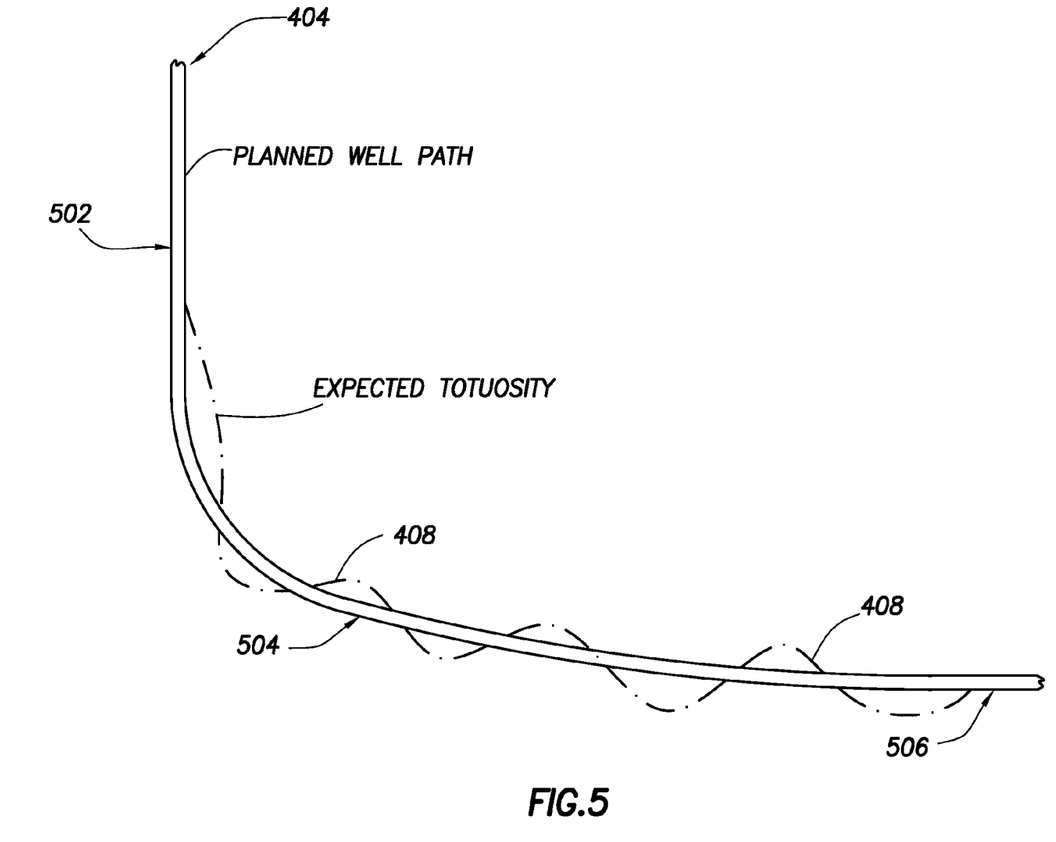
FIG. 5 is an elevation view which shows a planned wellpath in accordance with at least some embodiments.

FIG. 5 shows a cutaway elevation view of a section of a planned wellpath, such as the planned wellpath 404 depicted in FIG. 4. In particular, FIG. 5 shows two wellpaths to convey ideas regarding tortuosity. At the design stage, the planned wellpath may be represented by path 404 defining substantially vertical portion 502, a curved portion 504, and a substantially horizontal portion 506. It is highly unlikely that during actual drilling the wellbore can or will precisely follow the planned wellpath along line 404. Rather, in drilling wellbores at great distances from the surface (e.g., 4000 feet or more), undulations in the actual wellpath are likely. Planned wellpath 404 may thus have estimated tortuosity, as shown by dashed-dot-dashed line 408. The estimated tortuosity 408 is exaggerated for the sake of clarity.

Estimating the Tortuosity of a Planned Wellpath

At the planning stages, the estimated tortuosity 508 may be calculated from a plurality of data sources, including data from historical (i.e., previously drilled) wells having similar characteristics as the instant well, and/or from offset wells. Furthermore, by using data provided in the slide sheet used to plan the wellbore, an estimated tortuosity may be calculated.

Figure 6:
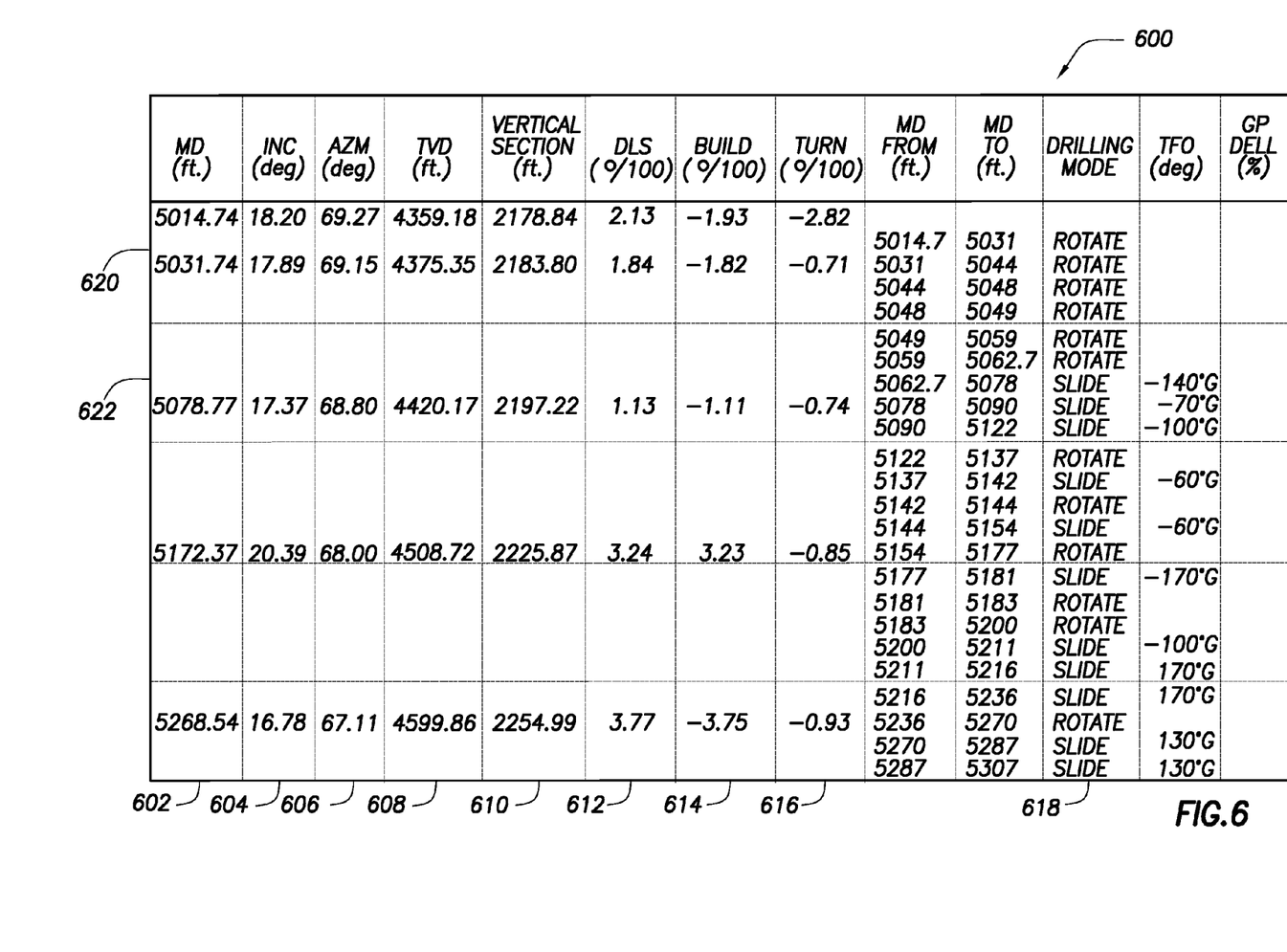
FIG. 6 is an example slide sheet in accordance with at least some embodiments.

In one embodiment, the planned wellpath may be associated with a planned slide sheet, such as the example slide sheet shown in FIG. 6. In other words, at the planning stage a slide sheet may be created for planned wellpath 404 before a drilling rig has been established at the proposed drilling site. The slide sheet comprises various planned values, including the planned slide drilling and rotational drilling times.

In particular, example slide sheet 600 is a data sheet which provides a record of various calculated and planned variables. Ultimately, the data contained on slide sheet 600 provides the driller with information used when attempting to drill the wellbore along the planned path. Although at the planning stages actual tortuosity has not yet been created, the slide sheet data can be used to calculate an estimated tortuosity for the planned wellpath based on the planned rotational drilling time and planned slide drilling time. In addition, other useful data is contained within the slide sheet.

Column 602 provides the planned measured depth (in feet) of the wellbore in reference to the other information provided within the slide sheet. In a directional well, the measured depth is the length of the drilled portion of the wellbore. In a vertical well, the measured depth is the true vertical depth from the surface; however, in a directional well, the measured depth will be longer than the measured depth due to the fact that, in a directional well, the length of the drilled portion of the wellbore will curve away from vertical.

Column 604 provides the planned inclination at each survey point, where the inclination is the angle (in degrees) of the deviation from vertical. Column 606 provides the planned azimuth at each survey point, where the azimuth is the angle (in degrees) of the wellbore on a horizontal plane measured clockwise from a north direction. Column 608 provides the planned true vertical depth at each survey point, where the true vertical depth is the vertical distance from a point in the well to a point on the surface. Column 610 provides the planned vertical section, where the vertical section is the horizontal distance at a survey point along the planned wellpath from the vertical axis of the starting location at the surface.

Column 612 provides the planned dogleg severity at each survey point where the dogleg severity is the measure of the amount of change in the inclination and/or azimuth of the wellbore (in degrees). Column 614 provides the planned build rate, which is the amount of curvature in the wellpath at the corresponding survey point (in degrees/100 feet). Column 616 provides the planned turn rate, which is how much the wellpath is expected to be turning to the left and right as viewed looking downward from the horizontal plane of the surface (in degrees/100 feet). Column 618 indicates whether the drilling mode will be in rotational drilling mode or slide drilling mode for each planned portion of measured depth. For example, between 5014.7 feet and 5031 feet, it is expected that the wellbore will be drilled in rotational drilling mode, whereas between 5062.7 feet and 5078 feet, it is expected the wellbore will be drilled in slide drilling mode.

During the planning stages, by considering the data provided in the planned slide sheet 600, including the relationship between rotational drilling time and slide drilling time, software in accordance with example embodiments can calculate an estimated tortuosity value for the planned wellpath as a whole, or for sections of the planned wellpath. If the estimated tortuosity value for the planned wellpath exceeds a predetermined threshold, the planned wellpath may need adjustment. For example, to change the planned wellpath, the relationship between the amount of rotational drilling and the amount of slide drilling time presented in the slide sheet may be changed. In another example, a different mud motor having a bent sub assembly with a different bend angle may be used. Other example changes may include changes to the planned diameter of the drilled hole, or a change in the physical location of where the drilling will commence on the surface. In particular, if the estimated tortuosity is indicative of excessive curvature, the physical location of the entry point of the wellbore may move farther away from the specified target to reduce the build rate in the curvature.

Planned and Actual Drilling Data

Although the embodiment discussed with respect to FIG. 6 was that of a planned slide sheet, other types slide sheets are possible throughout the drilling process. In another embodiment, multiple slide sheets may be possible for one wellpath. In other words, one slide sheet may contain data related to actual data measured and/or calculated from the portion of a wellpath which has been drilled, and another slide sheet may contain the planned data for the remaining undrilled portion of the wellpath. It yet another embodiment, the slide sheet may contain actual measured and/or calculated data for a fully drilled wellbore. For slide sheets containing actually measured and/or calculated data, it is possible to calculate an actual tortuosity value for drilled sections of a wellbore, where the tortuosity of a drilled portion of wellbore may be calculated by equation 1 below:

$$T = \frac{\sum_{i=1}^{m} \alpha_{n-1} + \Delta D \times \beta_1}{D_i - D_{i-1}} \quad (1)$$

where T is the calculated actual tortuosity of the wellbore; α is an inclination angle of the wellbore between two survey points, defined as angle between a tangent line along the wellbore and a vertical line; ΔD is a distance between two survey points in relation to a dogleg severity calculation; $\delta_i$ is a dogleg severity value at survey point i; and $D_i$ is a depth at a survey point i.

Figure 7:
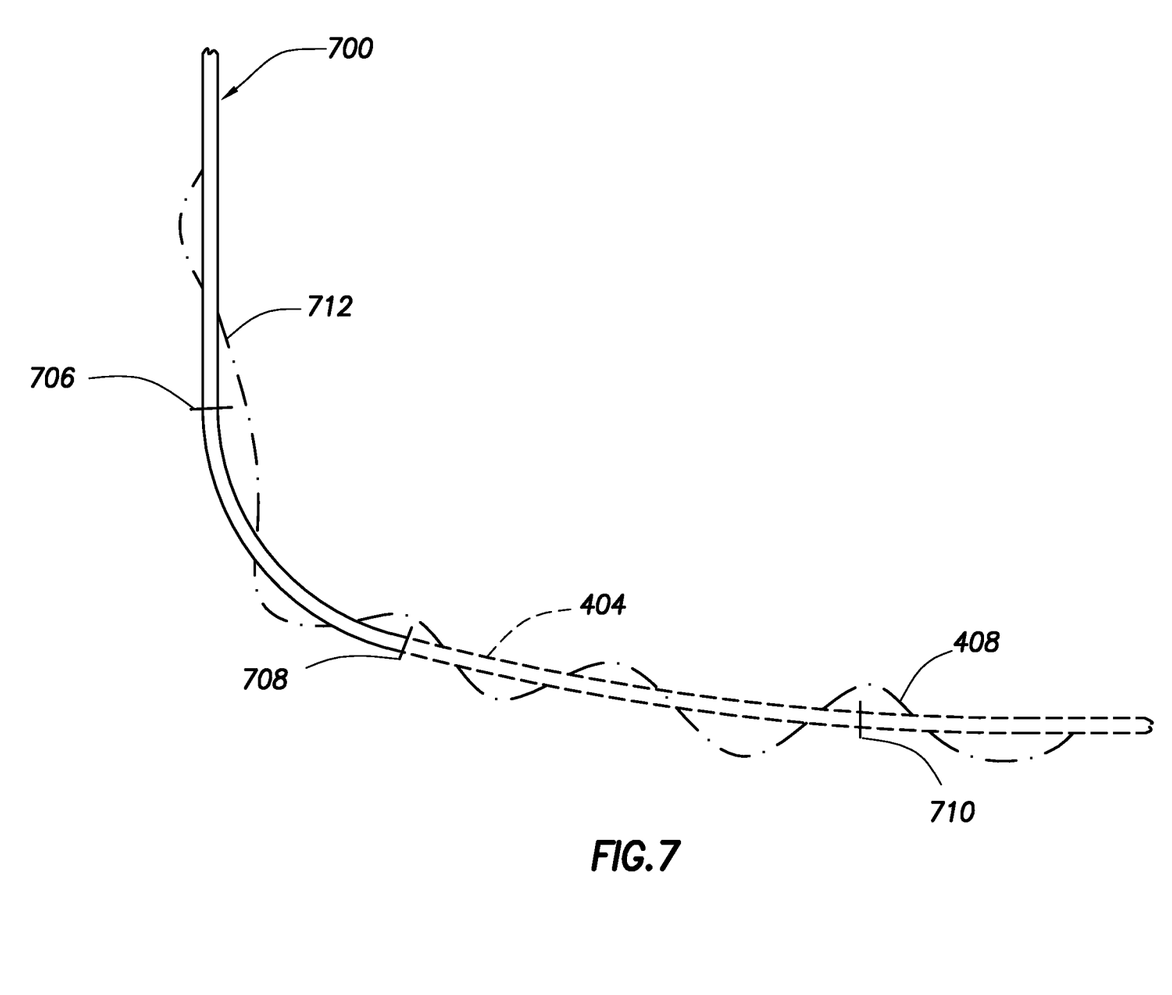
FIG. 7 is an elevation view which shows a partially drilled wellbore in accordance with at least some embodiments.

Regardless if the data contained within the slides sheets is for a planned wellpath, for an actually drilled portion of wellbore, or for a combination, the data may be used in conjunction with a model which can calculate estimated tortuosity. Before detailing the specifics of the model, the use of the model in various wellpath scenarios will now be discussed Various Wellpath Scenarios Partially Drilled Wellbore to Survey Point FIG. 7 shows a cutaway elevation view of a section of a partially drilled wellbore 700. In particular, FIG. 7 shows a portion of previously planned wellpath 404 (shown by dashed lines) located at the end of now partially drilled wellbore 700. In this example, the remaining undrilled section of planned wellpath 404 may be associated with an estimated tortuosity 704 (again, exaggerated for clarity).

FIG. 7 also shows three example survey points 706, 708 and 710. At each survey point, measured and observed data is gathered and, if necessary, calculated. For example, at survey point 708 it may be possible to calculate and determine the actual tortuosity value 712 (shown as dash-dot-dash line 712, and exaggerated for clarity).

However, since measurements and calculations are made at survey points, the tortuosity of the undrilled planned wellpath 404 is neither known nor able to be exactly calculated at this time. In other words, the actual tortuosity in a wellbore, or portion of a wellpath, is not known until the wellpath or portion of a wellbore has been drilled and surveyed.

Estimating what the tortuosity may be going forward in drilling the undrilled portion of planned wellpath 404 is useful knowledge for drilling an efficient well. In one embodiment, the planned slide sheet information regarding the remaining undrilled portion of planned wellpath 404 may be input into a model, where the model will calculate the estimated tortuosity 408.

If, based on a combination of the actual tortuosity 712 and the estimated tortuosity 408, the planned wellpath is achievable without encountering too many drilling issues, the drilling can continue along the planned wellpath 404. If, however, in considering the actual tortuosity 712 and the estimated tortuosity 408 calculated by the model, continuing drilling along planned wellpath 404 may cause issues, the driller may make adjustments to one or more drilling parameters to hit the specified target. In particular, the driller may adjust the trajectory of the wellpath by changing the amount of rotational drilling time versus the amount of slide drilling time. Other adjustments may include: changing the diameter of at least a portion of the planned wellpath; casing a portion of the wellbore; changing the diameter of a portion of the wellbore; or redrilling a portion of the wellbore.

In another embodiment, the model may be used to calculate tortuosity for a partially drilled wellbore along a planned wellpath, where drilling has occurred past a survey point, but before measurements are taken at a subsequent survey point.

Partially Drilled Wellbore in Between Survey Points

Figure 8:
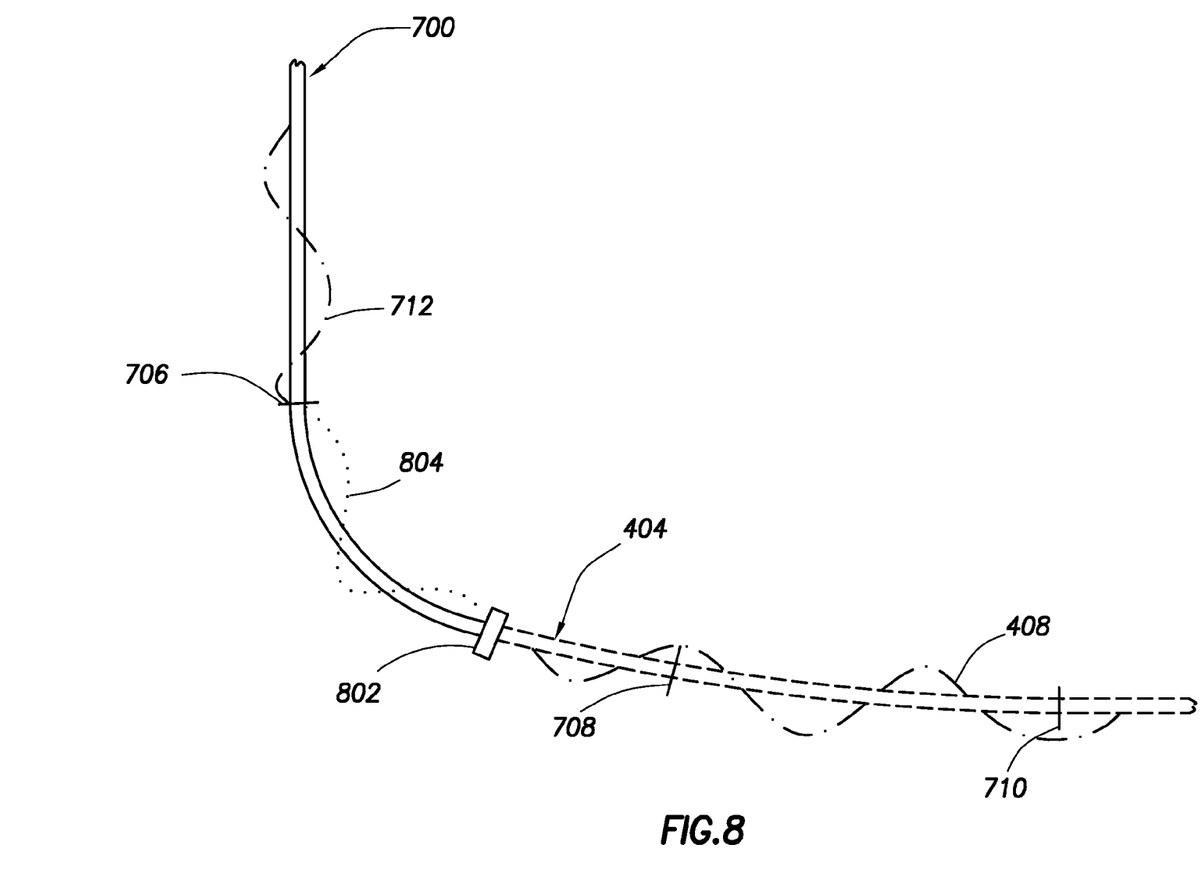
FIG. 8 is an elevation view which shows a partially drilled wellbore in accordance with at least some embodiments.

Turning now to FIG. 8, the partially drilled wellbore is shown in accordance with yet another scenario for which the model may provide calculations regarding estimated tortuosity. In particular, FIG. 8 shows partially drilled wellbore 700 which has been drilled to location 802. The remaining portion of the wellpath is the undrilled portion of planned wellpath 404. Along the wellpath are example survey points 706, 708, and 710. Because wellbore 700 has been drilled past survey point 706, the actual tortuosity 712 is able to be calculated only for the portion of the wellbore from the surface to survey point 706. The tortuosity 804 between survey point 706 and location 802 is not yet known, despite the fact the wellbore has already been drilled to location 802 because drilling has not yet extended to the next survey point 708.

Using the model, the estimated tortuosity 804 can be calculated based on the actual rotational drilling time and slide drilling time for the drilling between the survey point 706 and the location 802. In addition, the model, using planned slide sheet data for the undrilled portion of planned wellpath 404, can calculate an estimated tortuosity 408. Combining the estimated tortuosities 804 and 408 (i.e., the unknown but estimated tortuosities), along with the actual tortuosity 712, the driller can determine if it is possible to continue drilling along path 404 as planned. If the actual tortuosity 712 and the estimated tortuosities 804 and 408 are above a predetermined threshold, the driller may adjust the drilling plan.

In another embodiment, the model may be used to calculate tortuosity information for a partially drilled wellbore along a planned wellpath, where the drilling is off target from the planned wellpath.

Partially Drilled Wellbore Off Target

Figure 9:
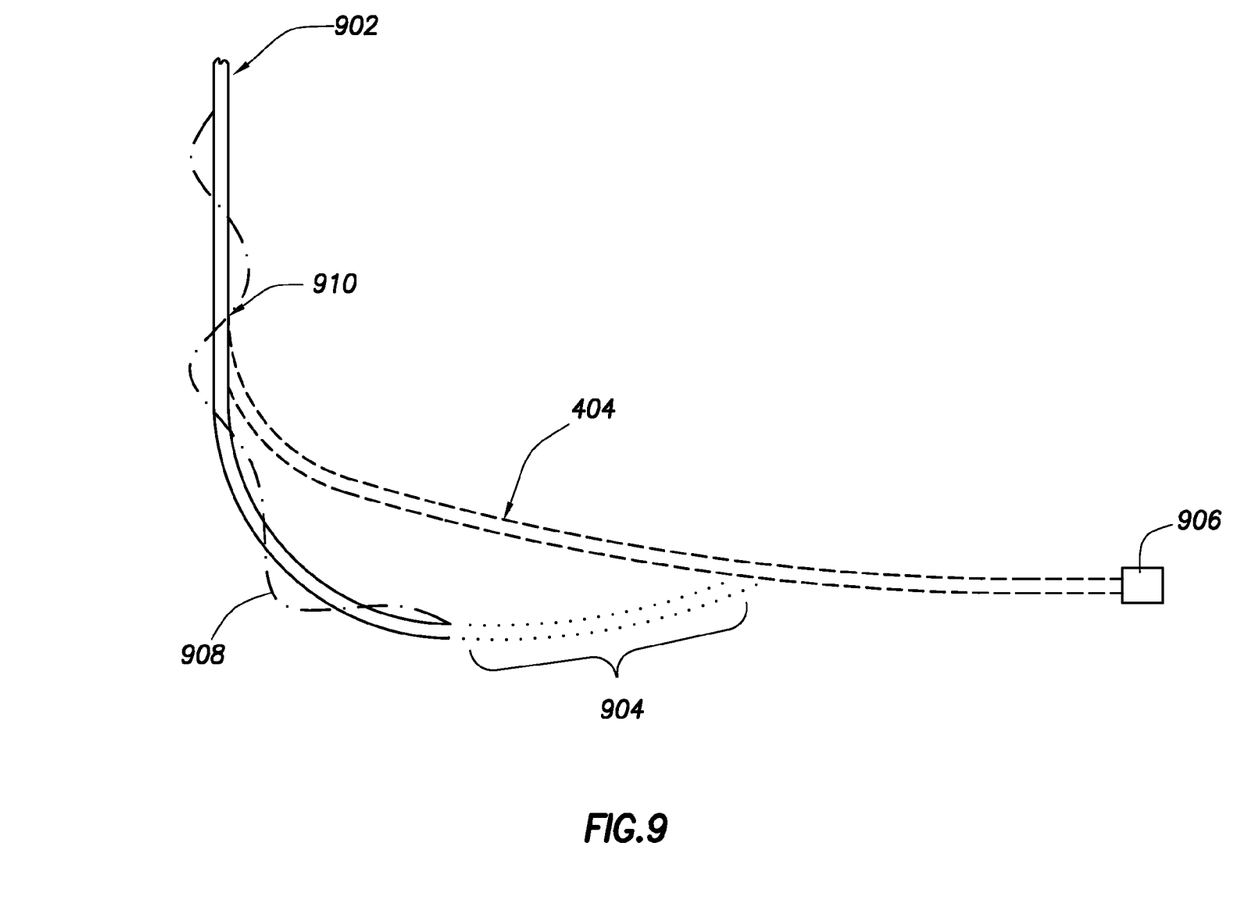
FIG. 9 is an elevation view which shows a partially drilled wellbore in accordance with at least some embodiments.

FIG. 9 shows a cutaway elevation view of a section of a partially drilled wellbore. In particular, FIG. 9 shows a portion of previously planned well path 404 (shown by dashed lines). FIG. 9 also shows partially drilled wellbore 902, where the partially drilled wellbore 902 has deviated from the planned wellpath 404 at about location 910. If the drilling path of partially drilled wellbore 902 continues along its current trajectory, it will most likely not hit the specified target 906. Thus, the driller should adjust the trajectory of the wellpath (such as by drilling along dotted lines 904) in order to get back on target. Before making changes to the wellpath to get back on the planned wellpath 404, the model may be used to calculate the estimated tortuosity of the newly planned wellpath based on a variety of data (some previously discussed). In one embodiment, the model may calculate the estimated tortuosity of newly planned path 904. That is, the planned slide sheet with the rotational drilling time and slide drilling time to implement the newly planned wellpath 904 may be applied to the model, and the model may calculate an estimated tortuosity for the remainder of the wellpath to the specified target 906. If the estimated tortuosity, in combination with the actual tortuosity 908, exceeds a tortuosity threshold then it may not be possible to drill along the newly planned wellpath 904 and still reach the specified target 906. If the combination of the actual and estimated tortuosities exceeds the tortuosity threshold, the driller may change any of a variety of previously discussed drilling parameters to correct the issue.

If the estimated tortuosity calculated by the model is such that new planned wellpath 904 is not a viable option, the driller will consider other options in order for drilling to successfully reach the specified target 906. For example, a different planned wellpath may be considered with less curvature. For each newly considered planned wellpath, the model may be used to calculate the estimated tortuosity, and the driller, considering the estimated tortuosity can ascertain a new drilling plan.

Operation of the Model

As previously discussed, the model may be used to calculate an estimated tortuosity of a planned wellpath by receiving as input values a plurality of different data. The model may operate in a variety of ways. In one embodiment the model may calculate a value indicative of estimated tortuosity by combining a plurality of mathematical models with the information regarding slide and rotational drilling time (e.g., ratio of planned rotational drilling time and planned slide drilling time). For example, in one embodiment, the model may calculate the estimated tortuosity value by way of artificial intelligence. In particular, the model may learn from previous calculations (e.g., actual tortuosity, slide drilling time, and rotational drilling time from one more offset wells) and use current data to predict and calculate the estimated tortuosity. In another embodiment, the model may make the calculations using a neural network to predict the tortuosity value based on data received by the model, where the neural network may be trained using actual tortuosity, slide drilling time, and rotational drilling time from one more offset wells. In yet another embodiment, the model may implement any of a number of mathematical methods, such as: a sine wave method; a helical method; a random inclination and azimuth method; and a random inclination dependent azimuth method.

Consider again the example scenario shown in FIG. 7. The model can calculate the estimated tortuosity 704 based on data provided in the planned slide sheet 600 (in particular the rotational drilling time and slide drilling time). Based on the estimated tortuosity 704, the driller can make the determination if the tortuosity value is above a threshold for which drilling issues may arise if the wellbore continues along the current and planned path 404. If the calculated tortuosity value is above a tortuosity threshold, then adjustments will be made to the wellpath or to other drilling parameters, such as the ratio of slide drilling time to rotational drilling time.

Adjusting the Model

In addition to receiving as input planned and/or expected measurements (i.e., from planned slide sheets), known and actually measured data may be used to update and refine the model algorithms. For example, returning again to FIG. 7, the tortuosity 712 is known from the surface to survey point 708. Prior to drilling, however, the model may have calculated the estimated tortuosity for that section of wellpath based on planned slide sheet data. Now that the tortuosity 712 has been actually measured and calculated, the actual tortuosity 712 may be used in order to update the model algorithms which are used to determine later tortuosities. In other words, the model may be fine-tuned and/or retrained to make better calculations by providing actually measured data.

In addition to actually measured data for the current wellpath, the model may also be updated by using actual tortuosities measured from offset wells or historical wells having similar characteristics and parameters. For example, nearby wells may have experienced similar tortuosity values to those expected in the current wellpath. Thus, the model may be made more robust by adjusting the algorithms based on actually measured offset well data. In another embodiment, historical information from wells having similar characteristics may be used to improve the model's ability to provide accurate and useful tortuosity estimations.

Example Computer System

Figure 10:
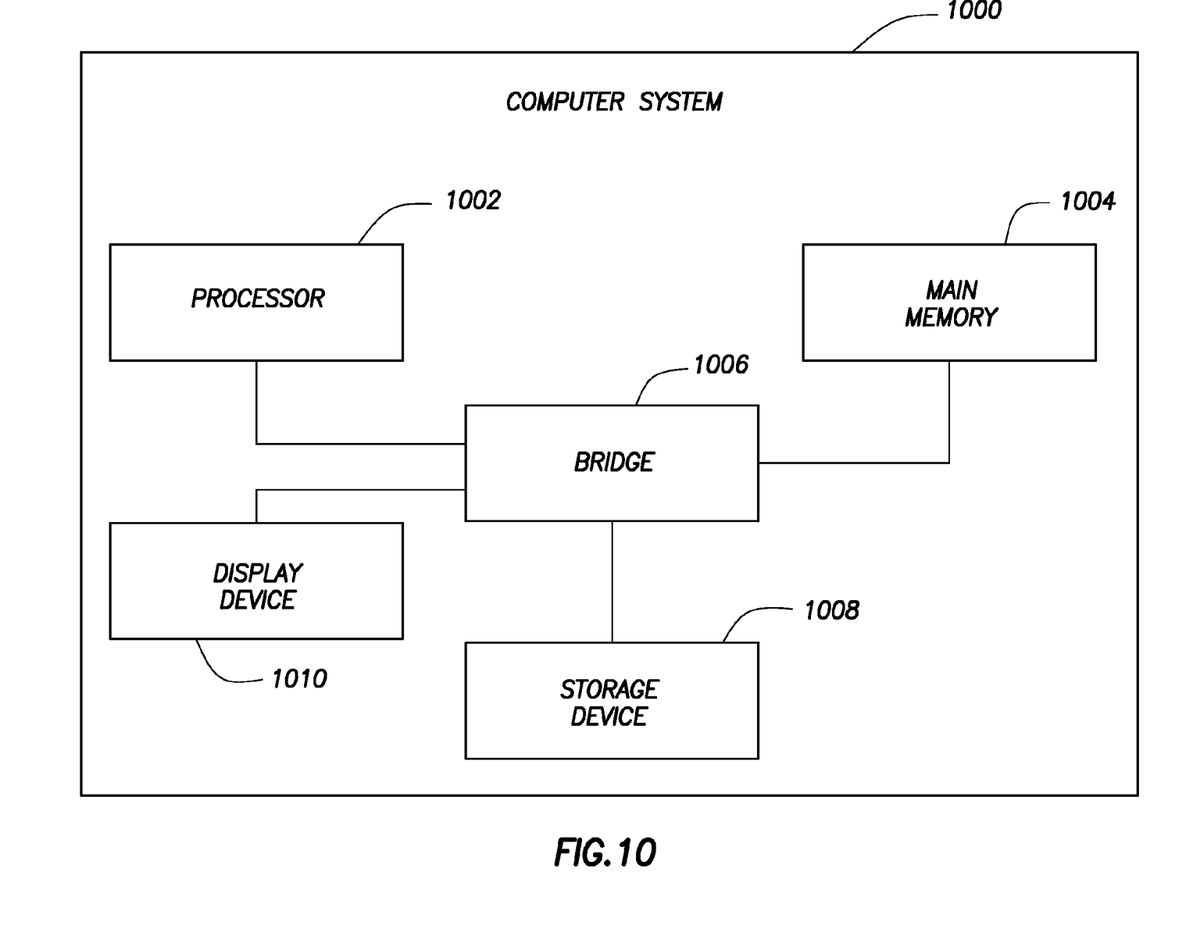
FIG. 10 is a block diagram that shows a computer system in accordance with at least some embodiments.

FIG. 10 illustrates in greater detail a computer system 1000 which may be used to calculate tortuosity values for a wellpath. Thus, computer system 1000 may be representative of computer systems 240 or 242, or any computer systems upon which the computer instructions that implement the model may be executed. The computer system 1000 comprises a processor 1002, and the processor couples to a display device 1010 and a main memory 1004 by way of a bridge device 1006. It is on the display device 1010 that the various calculations, including tortuosity values, may be displayed. Moreover, the processor 1002 may couple to a long term storage device 1008 (e.g., a hard drive, solid state disk, memory stick, optical disc) by way of the bridge device 1006. Programs executable by the processor 1002 may be stored on the storage device 1008, and accessed when needed by the processor 1002. In some cases, the programs are copied from the storage device 1008 to the main memory 1004, and the programs are executed from the main memory 1004. Thus, the main memory 1004, and storage device 1008 shall be considered computer-readable storage mediums.

Figure 11:
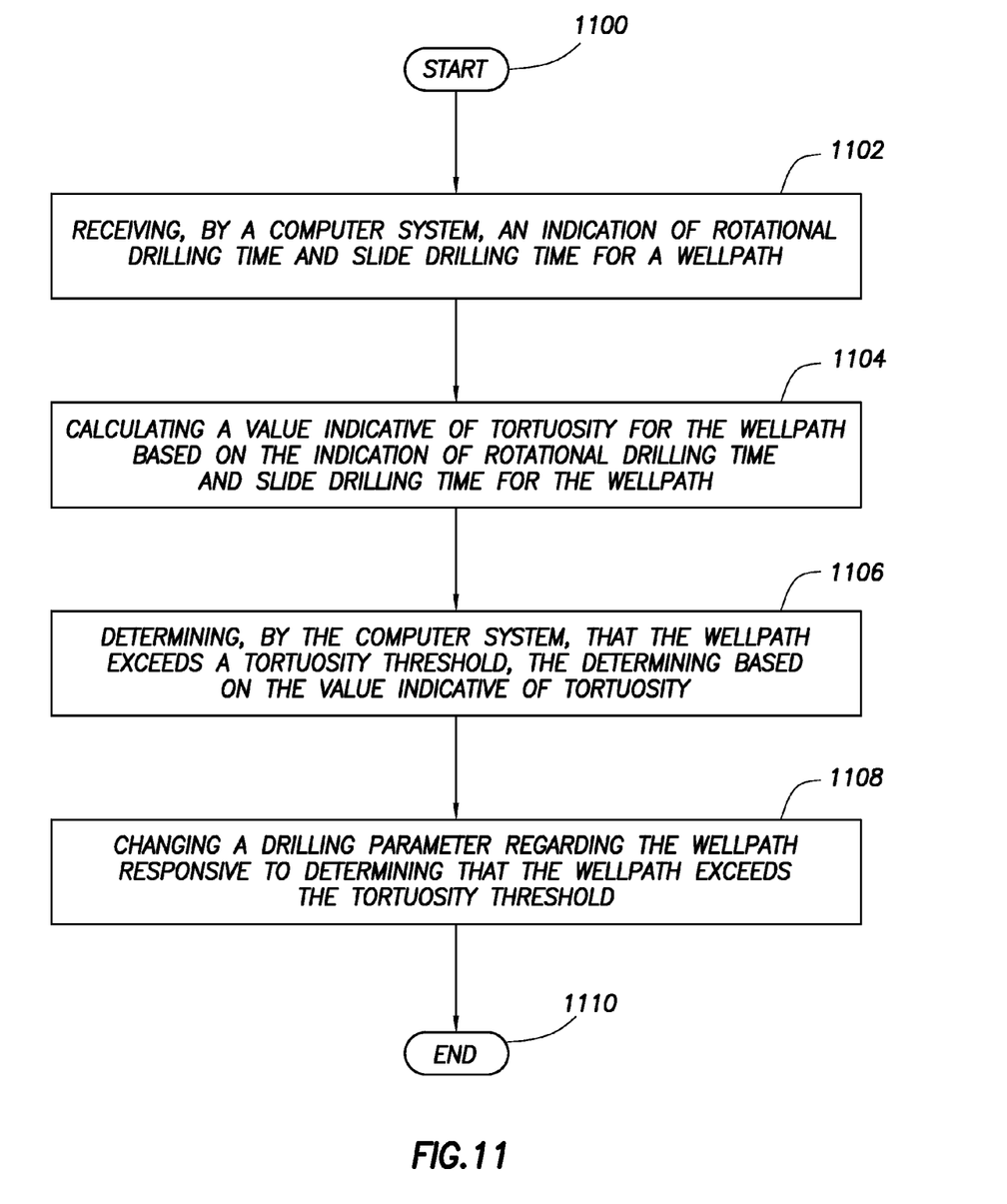
FIG. 11 is a block diagram that shows a method in accordance with at least one embodiment.

FIG. 11 shows a flow diagram depicting an overall method, some of which may be performed as a program executing on a processor. The method starts (block 1100) receiving, by a computer system, an indication of rotational drilling time and slide drilling time for a wellpath (block 1102); calculating a value indicative of tortuosity for the wellpath based on the indication of rotational drilling time and slide drilling time for the wellpath (block 1104); determining, by the computer system, that the wellpath exceeds a tortuosity threshold, the determining based on the value indicative of tortuosity (block 1106); and changing a drilling parameter regarding the wellpath responsive to determining that the wellpath exceeds the tortuosity threshold (block 1108). Thereafter, the method ends (block 1110).

It is noted that while theoretically possible to perform some or all the calculations discussed above by a human using only pencil and paper, the time measurements for human-based performance of such tasks may range from man-hours to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiment," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of calculating a tortuosity value based on a ratio of rotational drilling time to slide drilling time, this context shall not be read as a limitation as to the scope of one or more of the embodiments described—the same techniques may be used for other embodiments. It is intended that the following claims be interpreted to embrace all such variations and modifications.

We claim:

1. A method comprising:
   receiving, by a computer system, an indication of rotational drilling time and slide drilling time for a drilled portion of a wellpath;
   calculating a value indicative of tortuosity for an undrilled portion of the wellpath based on the indication of rotational drilling time and slide drilling time for the drilled portion of the wellpath;
   determining, by the computer system, whether or not the value indicative of tortuosity calculated for the undrilled portion of the wellpath exceeds a tortuosity threshold;
   changing a drilling parameter regarding the undrilled portion of the wellpath responsive to determining that the value indicative of tortuosity exceeds the tortuosity threshold; and
   drilling a wellbore along the undrilled portion of the wellpath according to the changed drilling parameter.

2. The method of claim 1 wherein calculating the value indicative of tortuosity further comprises applying the indication of rotational drilling time and slide drilling time to a model, where the model produces the value indicative of tortuosity of the undrilled portion of the wellpath based on a relationship between the indication of rotational drilling time and slide drilling time.

3. The method of claim 2 further comprising creating the model based on a measured tortuosity in an offset well.

4. The method of claim 2 wherein when the model produces the value indicative of tortuosity, the model further produces the value using at least one selected from the group consisting of: artificial intelligence; and neural nodes.

5. The method of claim 2 further comprising:
   receiving an indication of rotational drilling time and slide drilling time for a portion of the wellbore drilled along the undrilled portion of the wellpath;
   receiving an indication of actual tortuosity for the portion of the wellbore; and
   updating the model based on the indication of actual tortuosity for the portion of the wellbore and the indication of rotational drilling time and slide drilling time for the portion of the wellbore.

6. The method of claim 1 wherein the wellpath is designed to correct a deviation of the wellbore from a planned wellpath.

7. The method of claim 1 wherein:
   receiving comprises receiving, by the computer system, an indication of rotational drilling time and slide drilling time for a portion of the wellbore along the drilled portion of the wellpath;
   calculating comprises:
      calculating, by the computer system, a value indicative of tortuosity for the portion of the wellbore based on the indication of rotational drilling time and slide drilling time; and
      combining, by the computer system, the value indicative of tortuosity for the undrilled portion of the wellpath with the value indicative of tortuosity for the portion of the wellbore, thereby creating a combined tortuosity; and
   determining comprises determining, by the computer system, whether or not the undrilled portion of the wellpath exceeds the tortuosity threshold, based on the combined tortuosity.

8. The method of claim 1 wherein changing the drilling parameter comprises changing the rotational drilling time and slide drilling time for the wellbore to be drilled along the undrilled portion of the wellpath.

9. The method of claim 1 wherein the drilling parameter is selected from the group consisting of: a weight-on-bit; a rotational speed of a drillstring disposed within the wellbore; and a component of a bottomhole assembly of the drillstring.

10. A system comprising:
    a processor;
    a memory coupled to the processor;
    the memory storing a program that, when executed by the processor, causes the processor to:
    receive an indication of rotational drilling time and slide drilling time for a drilled portion of a wellpath;
    calculate a value indicative of tortuosity for an undrilled portion of the wellpath based on the indication of rotational drilling time and slide drilling time for the drilled portion of the wellpath;
    determine whether or not the value indicative of tortuosity calculated for the undrilled portion of the wellpath exceeds a tortuosity threshold;
    change a drilling parameter regarding the undrilled portion of the wellpath responsive to determining that the value indicative of tortuosity exceeds the tortuosity threshold; and
    drill a wellbore along the undrilled portion of the wellpath according to the changed drilling parameter.

11. The system of claim 10 wherein when the processor calculates the value indicative of tortuosity, the program further causes the processor to produce the value indicative of tortuosity of the undrilled portion of the wellpath based on a model, the model producing the value indicative of tortuosity of the wellpath based on an indication of rotational drilling time and slide drilling time.

12. The system of claim 11 wherein when the processor produces the value indicative of tortuosity, the program further causes the processor to produce the value based on a measured tortuosity in an offset well.

13. The system of claim 11 wherein when the processor produces the value indicative of tortuosity, the program further causes the processor to produce the value based on the model using at least one selected from the group consisting of: instructions that implement artificial intelligence; and instructions that implement nodes of a neural network.

14. The system of claim 11 wherein the program further causes the processor to:
 receive an indication of rotational drilling time and slide drilling time for a portion of the wellbore drilled along the undrilled portion of the wellpath;
 receive an indication of actual tortuosity for the portion of the wellbore; and
 update the model based on the indication of actual tortuosity for the portion of the wellbore and the indication of rotational drilling time and slide drilling time for the portion of the wellbore.

15. The system of claim 10 wherein when the processor receives, the program further causes the processor to correct receive an indication of slide drilling time and rotational drilling time selected to a deviation of the wellbore from a planned wellpath.

16. The system of claim 10 wherein the program further causes the processor to:
 receive an indication of rotational drilling time and slide drilling time for a portion of the wellbore along the drilled portion of the wellpath;
 calculate a value indicative of tortuosity for the portion of the wellbore based on the indication of rotational drilling time and slide drilling time;
 combine the value indicative of tortuosity for the undrilled portion of the wellpath with the value indicative of tortuosity for the portion of the wellbore, thereby creating a combined tortuosity; and
 determine whether or not the undrilled portion of the wellpath exceeds the tortuosity threshold, based on the combined tortuosity.

17. A non-transitory computer-readable medium storing a program that, when executed by a processor, causes the processor to:
 receive an indication of rotational drilling time and slide drilling time for a drilled portion of a wellpath;
 calculate a value indicative of tortuosity for an undrilled portion of the wellpath based on the indication of rotational drilling time and slide drilling time for the drilled portion of the wellpath;
 determine whether or not the value indicative of tortuosity calculated for the undrilled portion of the wellpath exceeds a tortuosity threshold;
 change a drilling parameter regarding the undrilled portion of the wellpath responsive to determining that the value indicative of tortuosity exceeds the tortuosity threshold; and
 drill a wellbore along the undrilled portion of the wellpath according to the changed drilling parameter.

18. The non-transitory computer-readable medium of claim 17 wherein when the processor calculates the value indicative of tortuosity, the program further causes the processor to produce the value indicative of tortuosity of the undrilled portion of the wellpath based on a model, the model producing the value indicative of tortuosity of the wellpath based on an indication of rotational drilling time and slide drilling time.

19. The non-transitory computer-readable medium of claim 18 wherein when the processor produces the value indicative of tortuosity, the program further causes the processor to produce the value based on a measured tortuosity in an offset well.

20. The non-transitory computer-readable medium of claim 18 wherein when the processor produces the value indicative of tortuosity, the program further causes the processor to produce the value based on the model being at least one selected from the group consisting of: instructions that implement artificial intelligence; and instructions that implement nodes of a neural network.

21. The non-transitory computer-readable medium of claim 18 wherein the program further causes the processor to:
 receive an indication of rotational drilling time and slide drilling time for a portion of the wellbore drilled along the undrilled portion of the wellpath;
 receive an indication of actual tortuosity for the portion of the wellbore; and
 update the model based on the indication of actual tortuosity for the portion of the wellbore and the indication of rotational drilling time and slide drilling time for the portion of the wellbore.

22. The non-transitory computer-readable medium of claim 17 wherein when the processor receives, the program further causes the processor to receive an indication of slide drilling time and rotational drilling time selected to a deviation of the wellbore from a planned wellpath.

23. The non-transitory computer-readable medium of claim 17 wherein the program further causes the processor to:
 receive an indication of rotational drilling time and slide drilling time for a portion of the wellbore drilled along the drilled portion of the wellpath;
 calculate a value indicative of tortuosity for the portion of the wellbore based on the indication of rotational drilling time and slide drilling time;
 combine the value indicative of tortuosity for the undrilled portion of the wellpath with the value indicative of tortuosity for the portion of the wellbore, thereby creating a combined tortuosity; and
 determine whether or not the undrilled portion of the wellpath exceeds the tortuosity threshold, based on the combined tortuosity.

* * * * *